United States Patent [19]

Kamoi et al.

[11] Patent Number: 5,044,733
[45] Date of Patent: Sep. 3, 1991

[54] SUPER TWISTED NEMATIC LIQUID CRYSTAL DISPLAY DEVICE HAVING THE STANDARD DEVIATION OF THE SPHERICAL GRAINS BEING NOT MORE THAN 3% AND THE DISPERSION QUANTITY OF THE SPHERICAL GRAINS BEING 100-200 GRAINS/MM$^2$

[75] Inventors: Sumio Kamoi; Yumi Matsuki, both of Kawasaki, Japan

[73] Assignee: Ricoh Company, Ltd., Tokyo, Japan

[21] Appl. No.: 489,024

[22] Filed: Mar. 5, 1990

Related U.S. Application Data

[63] Continuation-in-part of Ser. No. 233,747, Aug. 19, 1988, abandoned.

[30] Foreign Application Priority Data

Aug. 19, 1987 [JP] Japan ............................. 62-206987
Sep. 18, 1987 [JP] Japan ............................. 62-234404
Mar. 23, 1988 [JP] Japan ............................. 63-68731

[51] Int. Cl.$^5$ .............................................. G02F 1/13
[52] U.S. Cl. .................................................. 359/81
[58] Field of Search ............................... 350/334, 344

[56] References Cited

U.S. PATENT DOCUMENTS 4,705,360 11/1987 Funada et al. ....................... 350/344
4,804,254 2/1989 Doll et al. ............................. 350/344
4,837,058 6/1989 Aizawa et al. ................... 350/344 X

FOREIGN PATENT DOCUMENTS 0260022 12/1985 Japan ..................................... 350/344
0002130 1/1986 Japan ..................................... 350/344
0096624 4/1988 Japan ..................................... 350/344
0009419 1/1989 Japan ..................................... 350/344
0050025 2/1989 Japan ..................................... 350/344
2143336 2/1985 United Kingdom ................. 350/344

Primary Examiner—Stanley D. Miller
Assistant Examiner—Huy K. Mai
Attorney, Agent, or Firm—Oblon, Spivak, McClelland, Maier & Neustadt

[57] ABSTRACT

A super twisted nematic type liquid crystal display device includes two of substrates, at least one of which is made of a plastic film, transparent electrode films disposed on each inner face of the two of the substrates, a plurality of spacers dispersed between the two of the substrates for maintaining the two of the substrates at a predetermined space and a liquid crystal enclosed between said substrates. The spacers are of spherical grains, a standard deviation of a distribution with respect to diameters of the spherical grains is not more than 3.5% of an average diameter of the spherical grains, a dispersion quantity of the spherical grains between said substrates is 100 to 200 grains/mm$^2$, and the liquid crystal has a twisted angle of 180° to 270° with respect to liquid crystal molecules thereof.

3 Claims, 3 Drawing Sheets

SUPER TWISTED NEMATIC LIQUID CRYSTAL DISPLAY DEVICE HAVING THE STANDARD DEVIATION OF THE SPHERICAL GRAINS BEING NOT MORE THAN 3% AND THE DISPERSION QUANTITY OF THE SPHERICAL GRAINS BEING 100-200 GRAINS/MM$^2$

CROSS-REFERENCE TO RELATED APPLICATION

The present application is a continuous-in-part of application Ser. No. 233,747 filed on Aug. 19, 1988 now abandoned.

BACKGROUND OF THE INVENTION

1. Field of the Invention

The present invention relates a super twisted nematic type liquid crystal display device.

2. Description of the Related Arts

Conventionally, a spacer is used to maintain at a constant value the gap between a pair of upper and lower electrode substrate which hold liquid crystal therebetween in a liquid crystal display device using glass substrates.

As such spacer, cylindrical glass fibers, plastic beads or spherical $SiO_2$ grains are used. The diameter of the glass fibers can be controlled with high accuracy depending on the manufacturing method thereof. More particularly, the standard deviation of the fiber diameters is on$=0.1$ $\mu$m or less. Therefore, if a liquid crystal display device of a plastic film substrate type is made using glass fibers as the spacer, the resulting cell gap is of high accuracy.

Glass fibers are distributed over and adhered to the whole of at least one of opposing surfaces of the upper and lower electrode substrates constituting a package.

However, the glass fibers are cylindrical, and has a length density of about 20 $\mu$m, so that if they are dispersed at a high density, for example, of 30 fibers/mm$^2$ or more, many fibers would overlap and even dispersion of the fibers would be difficult. Since the glass fibers are made of an inorganic material, and has a significant hardness, they may damage transparent conductive films on the plastic film substrates to thereby causing disconnections.

Specially, the rate increases at which disconnections occur at liquid crystal display devices having thin electrodes to perform graphic display and thus the glass fibers have been regarded as not suitable for the plastic substrates.

Although the spherical grains are not overlapped through high density dispersion to thereby damage on the transparent conductive films, the accuracy of the grain diameters is not high compared to that of glass fibers. For example, the accuracy of the plastic bead diameter is low (their standard deviation $\sigma$ is 0.4 $\mu$m), and the cell gap is uneven. In this connection, $0.4 > \sigma > 0.25$ for the plastic beads and $0.2 > \sigma$ for $SiO_2$. The shape of the beads is spherical, so that the beads as the spacers are likely to move within the cell, regions where there are fewer beads appear at reliability test and uneven color distribution occurs.

Recently, a display system has been proposed and put already to practical use which operates in a mode referred to as SBE (super twisted birefringence effect) or STN (super twisted numatic) having a twisted angle of 180° or more.

STN type liquid crystal displays have a display mode applying a double refraction of liquid crystal to a display system, STN type liquid crystal displays have a rising characteristics of liquid crystal shaper than that of conventional twisted nematic type liquid crystal displays (TN LCDs), it is possible for STN type LCD to have a panel with a large display capacity.

STN type liquid crystal displays are recently used in word processor or personal computer as a display unit. They can be provided with 640×480 dots (1/480 Duty) at maximum.

According to this type, the color changes by a small change $\Delta n \cdot d$ (where $\Delta n = \overline{ne} - \overline{no}$, $\overline{ne}$ is the refractive index of liquid molecules along their longer axes, $\overline{no}$ is the refractive index of the liquid molecules along their shorter axes, and d is the cell gap), so that if there are variations in the gap of the cell, uneven color distribution is produced. It is clear from the results of simulations and experiments that an allowance of $\Delta n \cdot d$ in which no uneven color distribution cannot be recognized by the naked eye is about ±0.005 $\mu$m or less. The value of $\Delta n$ varies depending on liquid crystal to be used and if it is assumed to be about 0.1, a change in d is ±0.05 $\mu$m or less.

Japanese Patent Laying-Open (KOKAI) No. 63-96634 has disclosed a LCD in which the quantity of spacer dispersion is arranged to be 120 to 250 grains/mm$^2$. The most suitable value of a gap can obtained by making the quantity of the dispersion the most suitable (in the case where a glass panel is used). However, the quantity of the dispersion causes the scattering of the values of the gap in the case of a PF-LCD. Therefore, fine irregular color appears.

Japanese Patent Laying-Open (KOKAI) No. 60-260022 has disclosed a PF-LCD using spherical beads and in which the quantity of the dispersion is arranged to be 50 to 100 grains/mm$^2$. In the case of a TN type PF-LCD, since the influence of change in a cell gap upon the display quality is not significant, the display quality is not changed significantly by the quantity of the dispersion. Therefore, it is significant for the quality of the spray to be 50 to 100 grains/mm$^2$. However, in the case of a STN type, displayed colors are changed due to change in $\Delta n \cdot d$ (where $\Delta n$: the birefringent anisotropy, d: the cell gap). Therefore, the accuracy in the cell gap is changed depending upon the quantity of the dispersion, causing the irregular color to easily take place. If the dispersion quantity is 50 to 100 grains/mm$^2$, fine irregular color appears.

Japanese Patent Laying-Open (KOKAI) No. 62-86331 has disclosed a device arranged in such a manner that the diameters of grains are 1 to 10 $\mu$m and the standard deviation value of the distribution of the diameters of grains is 0.3 $\mu$m or less.

On the other hand, a spherical spacer displays a larger standard distribution value than that of glass fiber. For example, the Micropearl SP manufactured by Sekisui Chemical Co., Ltd. displays a standard deviation value of about 0.4 $\mu$m. Since substrate are aligned along the gap material in the case of the PF-LCD, the value of the standard deviation completely corresponds to the irregular gap.

We found facts as a result of the studies that substantially no irregular color can be observed in the case of a cell of 8 $\mu$m or more if the standard deviation value is 0.3 $\mu$m or less, and that visual irregular color appears when the standard deviation value is 0.3 $\mu$m in the case where the cell gap value 6 $\mu$m to 7 $\mu$m.

SUMMARY OF THE INVENTION

The object of the invention is to provide a STN type liquid crystal display device having an uniformed cell gap and able to reduce irregular color.

According to the present invention, the above object is achieved by a super twisted nematic type liquid crystal display device, comprising: two of substrates, at least one of which is made of a plastic film; transparent electrode films disposed on each inside of the two of the substrate; a plurality of spacers dispersed between the substrates for maintaining the two of the substrates at a predetermined space, the spacers being of spherical grains, a standard deviation of a distribution with respect to diameters of the spherical grains being not more than 3.5% of an average diameter of the spherical grains, a dispersion quantity of the spherical grains between the substrates being 100 to 200 grains/mm$^2$; and a liquid crystal enclosed between the substrates and having a twisted angle of 180° to 270° with respect to liquid crystal molecules thereof.

According to the present invention, an uneven color distribution and deterioration of the display quality can be prevent. Especially, in the STN display process in which the accuracy of the cell gap will appear as an uneven color distribution, the accuracy of the cell gap is improved to such an extent that no uneven color distribution can be recognized visually.

DETAILED DESCRIPTION OF THE INVENTION

Embodiments of the present invention will now be described in detail with reference to the drawings.

The present invention should not be taken as restricted to those embodiments and various changes modifications could be made by those skilled in the art without departing from the spirit and scope of the invention.

The spacers of the present invention are made of spherical grains such that as plastic beads whose main component is divinyl benzene, $SiO_2$ beads and $Al_2O_3$ beads. And the present invention has the standard deviation value of the distribution of the diameters of grains is 3.5% or less of the average diameter of grains and the quantity of dispersion is 100 to 200 grains/mm$^2$. If the standard deviation value exceeds 3.5% fine irregular or uneven color cannot be prevented and the display quality deteriorates even if the quantity of dispersion is 100 to 200 grains/mm$^2$. On the contrary, if the quantity of dispersion is less than 100 grains/mm$^2$ or exceeds 200 grains/mm$^2$, the irregular color becomes apparent even if the standard deviation value is 3.5% or less.

In order to remove flashes at the ends of glass fibers and to round the fiber ends, it is required to treat the glass fibers with a solution which dissolves glass. As such solution, conventionally well-known glass etching solutions (hydrofluoric acid solutions containing a mixed solution of a hydrofluoric acid and an ammonium fluoride), strong alkali solutions (potassium hydroxide-saturated ethanol solutions or aqueous sodium hydroxide-saturated solutions) may be used. Glass fibers used as the spacer are dipped into the etching solution. By this dipping, flashes at the ends of the glass fibers are dissolved and round-ended fibers are produced. The entire surfaces of the glass fibers are also dissolved in this dipping process, so that possible flashes on the surfaces of the glass fibers are also eliminated. In the dipping process, the local solution of the glass fibers is not desirable because it will lead to formation of an uneven gap. Thereof, in the dipping process, it is desirable to use stirring means such as ultrasonic distribution means in order to equalize the density of the solution. The dipping process is performed by controlling the density of the solution, the humidity and the time for the dipping process until the flashes are completely eliminated. This treatment is not necessarily required to be performed on the whole surfaces of the glass fibers and may be performed on only the ends of the fibers.

Figure 1:
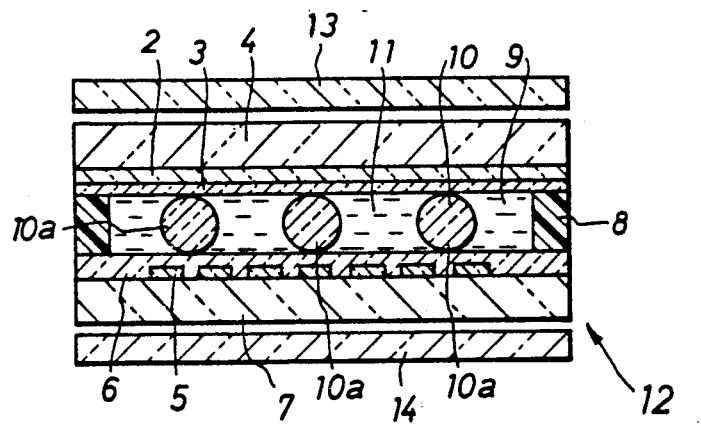
FIG. 1 is a cross sectional view of a LCD having cylindrical glass fibers.
Figure 2:
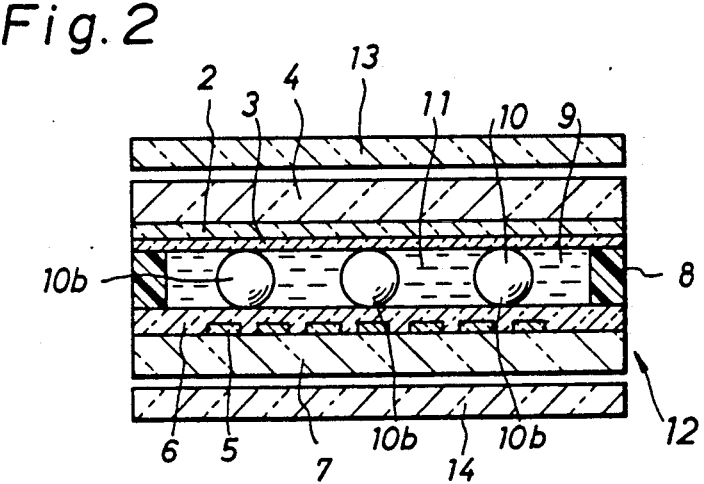
FIG. 2 is a cross sectional view of an embodiment of the present invention.
Figure 3:
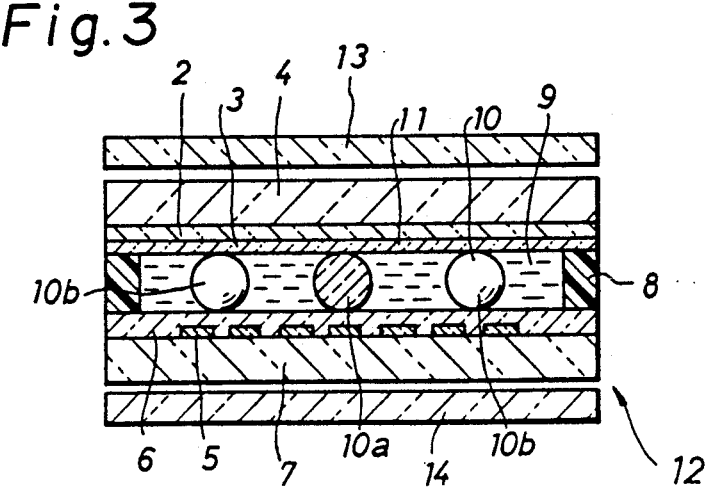
FIG. 3 is a cross sectional view of a LCD having cylindrical glass fibers and spherical grains; .

FIGS. 1 to 3 show cross-sectional views of liquid crystal display devices 1. These devices 1 replace a conventional twisted nematic (TN) type liquid crystal device (LCD) having a limited display capacity. They have a panel having a large display capacity, and a display system operating in a mode referred to as a SBE or STN type having a twisted angle of 180° or more. They have already been put to practical use.

A liquid crystal cell 12 includes a pair of spaced opposing upper and lower spaced substrates 4 and 7, a transparent electrode film (ITO) 2 and an aligning film 3 formed on the inner surface of upper substrate 4, a transparent electrode film (ITO) 5 and an aligning film 6 formed on the inner surface of lower substrate 7, and a liquid crystal layer 11 of liquid crystal molecules 9 and spacers 10 sealed by a seal member 8 between substrate 4 and 7. Each of opposing electrode films 2 and 5 may take the form of a dot matrix. A pair of upper and lower polarizers 13 and 14 are disposed so as to hold liquid crystal cell 12 therebetween.

Substrates 4 and 7 are liquired to have a transparency to light and may be made of a monoaxial stretched plastic film such as a monoaxial stretched polyester film. They may be a film made of polyester sulfone, polycarbonate, polysulfone, polyethylene polyethylene terephthalate, or naphthalate, the surface of the film may be processed. At least one of substrates 4 and 7 is required to be a plastic film while the other may be a glass plate.

A rubbed polymer film made of polyamide or polyimide is typically used as the aligning films 3 and 6. Liquid crystal molecules 9 used are of positive dielectric anisotropy. More particularly, a mixture of p-type nematic liquid crystal and chiral nematic liquid crystal or cholesteric liquid crystal is typically used as the liquid molecules 9.

The particular embodiments are directed to the structure of spacer 10 in conjunction with plastic substrate 4 and 7.

FIG. 1 shows a LCD in which spacer 10 includes cylindrical glass fibers 10a and have a standard deviation of 0.1 μm or less on their diameters when the diameter of the fibers have an average diameter of 8.0 μm. The disperse density of the glass fibers is 5 to 30 pieces/mm² or less in order to avoid overlapping.

FIG. 2 shows an embodiment of the present invention in which spacer 10 includes spherical grains 10b of plastic beads or metal oxide beads. Grains 10b have a standard deviation of 0.3 μm or less on their diameters when the average diameter of grains 10b is 8.0 μm. Preferably, the disperse quantity is 100 to 200 grains/mm².

Figure 4:
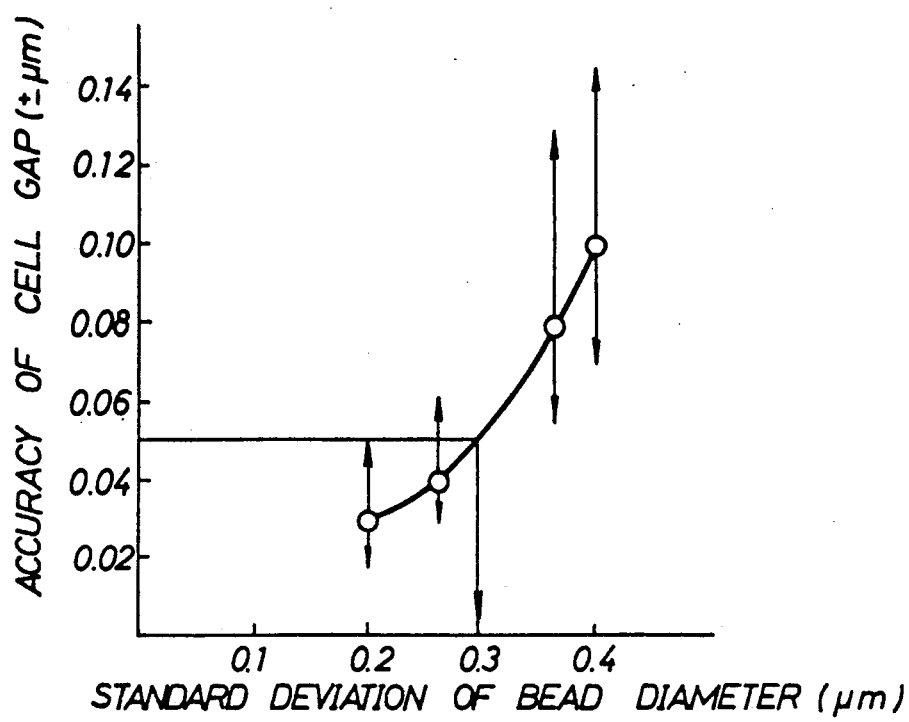
FIG. 4 is a graph showing the relationship between standard deviation on the diameters of plastic beads and accuracy of the cell gap.

FIG. 4 is a graph showing the relationship between standard deviation of the diameters of spherical plastic beads and accuracy of the cell gap. The measured values shown in FIG. 4 are obtained from a cell having a display area of 50 mm × 100 mm and 128 × 256 electrode dots. The average diameter of spherical beads used is 8.2 μm.

The accuracy of the cell gap is represented by $|dmax$ or $dmin - \bar{d}|$, where $\bar{d}$ is the average value of 10 measured cell gaps.

As is clear from FIG. 4, in order to suppress fluctuations of d to within ±0.05 μm in which uneven color distribution is not recognized by the naked eye, the standard deviation of the diameters of the spherical beads if preferably 0.3 μm or less.

Figure 5:
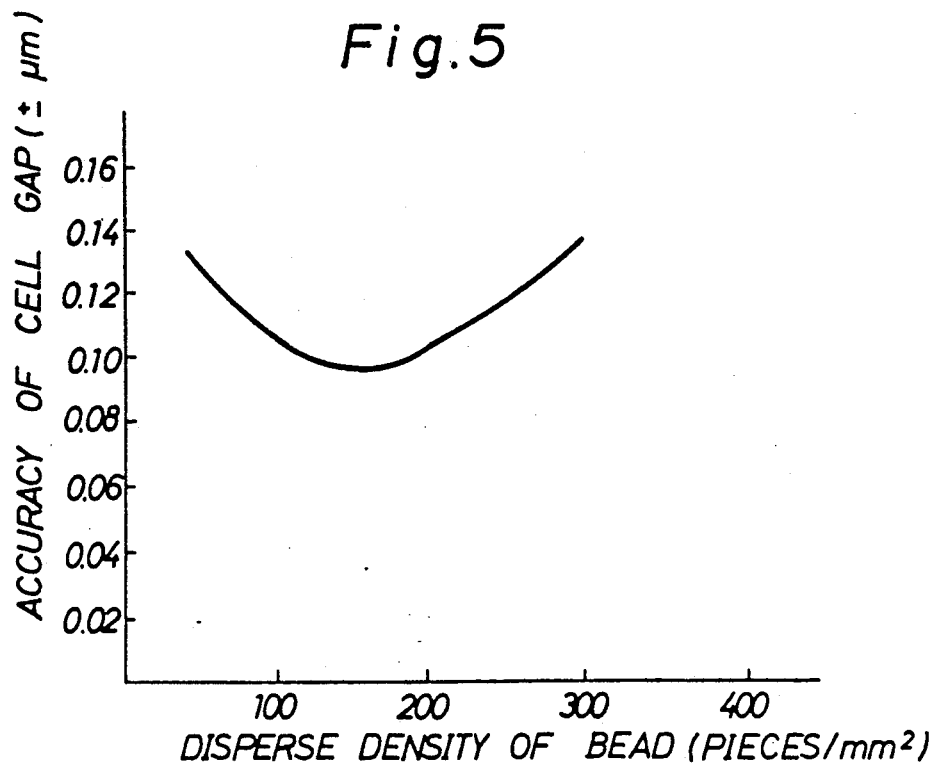
FIG. 5 is a graph showing the relationship between bead dispersion density and accuracy of the cell gap.

FIG. 5 shows the relationship between disperse density of bead and accuracy of the cell gap which was also measured as in FIG. 4. As is seen FIG. 5, the accuracy of the cell gap exhibits a minimum value when the disperse density is 150 pieces/mm². In order to suppress fluctuations of d to within ±0.5 μm in which uneven color distribution is not recognized by the naked eye (the accuracy of the cell gap, dmax − dmin = 0.1 μm), a dispersion of 120 to 190 pieces/mm² is required. The average diameter of the grains used in the measurement related to FIG. 5 was 8.2 μm and the standard deviation was 0.27 μm.

FIG. 3 shows a LCD with cylindrical glass fibers and spherical grains. Basically, spacer 10 includes a mixture of spherical grains 10b of either plastic beads or metal oxide beads and cylindrical glass fibers 10a dispersed on the inner surfaces of the substrates 4 and 7. The spherical grains 10b have a standard deviation of 0.3 μm or less on their diameters and a disperse quantity of 20 to 200 grains/mm². Cylindrical glass fibers 10a have the same diameter as the spherical grains 10b and a disperse density of 5 to 30 pieces/mm².

Glass fibers 10a will now be described in more detail. The glass fibers 10a used have a standard deviation of 0.1 μm or less on their diameters when the average diameter is 8.0 μm. The disperse density is 30 pieces/mm² or less in order to avoid overlapping.

Spherical grains 10b will now be described in more detail. In the display system operating in a mode referred to as SBE or STN shown in FIG. 3, a small change Δn.d (where Δn = ne − no, ne is the refractive index of liquid crystal molecules 9 along their longer axes, no is the refractive index of liquid crystal molecules 9 along their shorter axes, and d is the cell gap, namely the thickness of liquid crystal layer 11) causes color to change, so that if there are variations in the gap d in the cell, uneven color distribution will occur. Simulations and experiments have clarified that the allowance of Δn.d is which uneven color distribution cannot be recognized by the naked eye is about ±0.005 μm or less. While the values n vary depending on the liquid crystal used, the allowable fluctuation of the cell gap d is ±0.05 μm or less if Δn is assumed to be about 0.1.

Spherical grains 10b may be made of either plastic or SiO₂. Although SiO₂ is higher in processed accuracy than plastic, a few (two or three) SiO₂ grains are likely to form masses of two or three grains adhering to each other to thereby produce uneven color distribution. Although plastic grains are less in processed accuracy than SiO₂, the occurrence of uneven color distribution is avoided even in systems operating in the mode referred to as SBE, etc., by restricting the standard deviation of the grain diameters to within 0.3 μm. The plastic grains have high dispersiveness and are present separately from each other, so that plastic spherical grains, for example, of a plastic bead, ensure a cell gap a having a higher accuracy than the SiO₂ grains. Preferably, the disperse quantity of plastic grains is 20 to 200 grains/mm².

As described above, according to the particular embodiment, spacer 10 includes a mixture of dispersed spherical grains 10b of plastic beads having the particular standard deviation of their diameters and a disperse density of 20 to 200 grains/mm², and glass fibers 10a dispersed among the plastic beads at a disperse density of 5 to 30 pieces/mm² between the substrates 4 and 7. Therefore, the cell gap d is maintained by both the spacer elements of glass fibers 10a and spherical grains 10b. The glass fibers 10a serve to prevent uneven color distribution which would otherwise be produced when spherical grains 10b move.

The explanations on color difference according to the CIE 1976 color system by the "International Commission on Illumination" are set forth below. There is a method which uses color difference ΔE* as a method of a quantitatively evaluating the irregular color. We employed a (L* U* V*) color space so as to make evaluations (where L* is the psychometric lightness in the L*u*v* color system, u* is the sensory chromaticity exponent in the u chromaticity coordinate, and v* is the sensory chromaticity exponent in the v chromaticity coordinate).

The rectilinear distance between two points representing two sensory colors in the color space, that is, the color difference ΔE*u*v* in the L*u*v* color system can be obtained from: ΔE*u*v* $[(\Delta L^*)^2 + (\Delta u^*)^2 + (\Delta v^*)^2]^{\frac{1}{2}}$, (where ΔL* is the rectilinear distance between two points on L*, Δ* is the rectilinear distance between two points on u*, and Δu* is the rectilinear distance between two points on v*). In order to quantify the irregular color in a cell, the overall body of the cell was measured by 100 points so as to obtain ΔE*max which is arranged to be the color difference. The more the value becomes, the more the irregular color is. If ΔE*max exceeds 5, irregular color is confirmed. Therefore, ΔE*max < 5 must be met for the purpose of lowering the level of irregular color substantially below the visual level.

Figure 6:
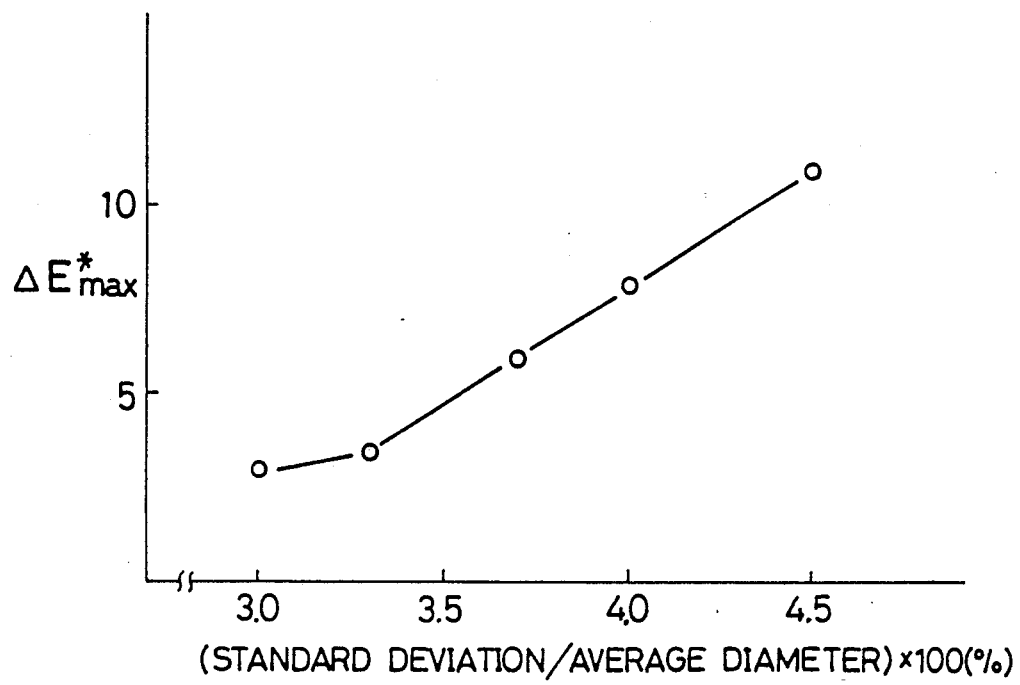
FIG. 6 is a graph illustrating the relationship between (standard deviation/average diameter)×100% and $\Delta E^*max$.

FIG. 6 illustrates the relationship between (standard deviation/average diameter) × 100% and ΔE*max.

If the standard deviation value/average diameter of grains exceeds 3.5%, ΔE*max 5 or more, causing irregular color to be apparent. However, the average diameter of grains was 6.5 μm and the average dispersion quantity was 150 grains/mm² in this state. As is shown from FIG. 1, the standard deviation value of the particle size distribution must be 0.23 μm or less when plastic beads of the average diameter of 6.5 μm is used.

Figure 7:
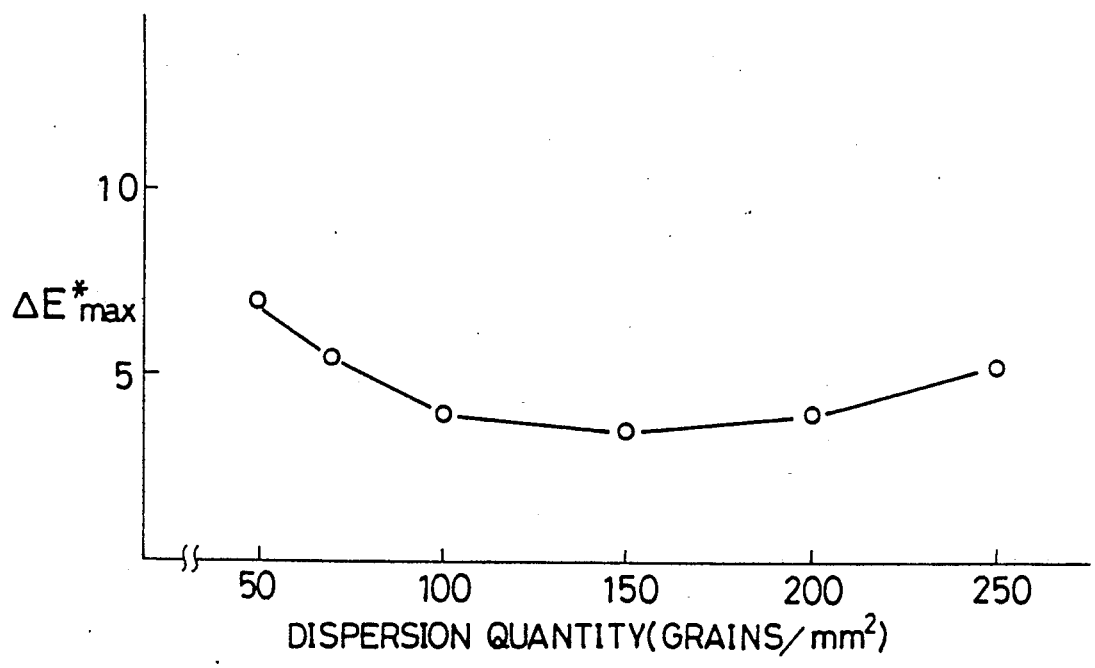
FIG. 7 is a graph illustrating the relationship between the dispersion quantity and $\Delta E^*max$.

FIG. 7 illustrates the relationship between the dispersion quantity and the ΔE*max.

When the dispersion quantity is less than 100 grains/mm$^2$ and more than 200 grains/mm$^2$, ΔE*max becomes 5 or more. Therefore, the most suitable dispersion quantity becomes 100 to 200 grains/mm$^2$. The gap material displayed an average diameter of 6.5 μm and a standard deviation value of 0.22 μm (3.4%) at this time. The LCD represented in FIG. 1 will be described in more detail.

(1) Glass fibers (PF - 80S) manufactured by Nippon Electric Glass Co., Ltd., were dipped in a potassium hydroxide-saturated ethanol solution and subjected to ultrasonic dispersion at room temperature for 60 minutes to thereby remove possible flashes.

The processed fibers were dipped into IPA solution so as to be a density of 4 mg/cc to be used as the spacer material. The substrates used were monoaxial stretched polyethylene terephthalate films on which ITO electrodes are formed and having a thickness of 100 μm. The ITO electrodes were processed in a desired manner using a photolithographic process to produce upper and lower electrode plates. Aligning films were then formed by coating on the electrode plates. The substrates were subjected to a rubbing operation. Spacer elements were dispersed over one of the rubbed substrates using a spinner coating process so as to provide a disperse density of 30 to 70 pieces/mm$^2$. A seal material was applied to the other substrate by printing. The upper and lower substrates were then adhered to each other such that they hold the spacer elements therebetween, and the seal material is set by thermal setting.

Liquid crystal was enclosed and sealed in a vacuum sealing process to form a cell. In the resulting cell, the ratio of disconnection was 10% or less and the cell gap was 8.0±0.03 μm.

(2) The same experiment as that in the above (1) was conducted except that plastic beads having a diameter of about 8.0 μm were used as the spacer. The results were that the rate of disconnection was 3% or less and the accuracy of the cell gap was 8.1±0.15 μm.

(3) The same experiment as that in the above (1) was conducted except that unprocessed glass fibers were used as the spacer. The results were that the rate of disconnection was 60% and the accuracy of the cell gap was 8.0±0.03 μm.

The embodiment of the present invention will now be described in more detail.

EXAMPLE 1

A pair of monoaxial stretched polyethylene terephthalate (PET) films each having thereon an ITO film having a thickness of 100 μm was processed to form a pair of 128×256-dot electrodes using a photo lithographic technique. "HL-1100" manufactured by Hitachi Chemical Co., Ltd., was coated on the electrodes to form aligning films having a thickness of 1,500 Å and dried at 100° C. for 60 minutes. The resulting products were then subjected to a rubbing operation such that the twisted angle was 200°. Plastic beads (manufactured under Trade name "MICROPEARL" by Sekisui Fine Chemical Co., Ltd.) having an average diameter of 8.21 μm and a standard deviation of 0.26 μm on the diameters were applied to one of the substrates so as to have a dispersion quantity of 150 grains/mm$^2$. A flexible epoxy adhesive was applied to the other substrate in screen printing. These substrates were then adhered to each other by the adhesive and the adhesive was set at 80° C. for one hour. A mixture of chiral nematic crystal and nematic liquid crystal were then enclosed between the substrates in a vacuum sealing process, left until the cell gap became uniform, and the inlet for the liquid crystal was then sealed.

No uneven color distribution could be recognized on the appearance of the resulting cell by the naked eye, namely, the cell exhibited a uniform excellent display. The cell gap was 8.30±0.04 μm.

EXAMPLE 2

An electrode of 128×256 dots was formed by processing a uniaxially oriented PET film with ITO film of which the thickness of a pair is 100 μm by utilizing photo lithography technology. Then, HL-1110 manufactured by Hitachi Chemical Co., Ltd. was applied to serve as an orienting film by a thickness of 1000 Å before being dryed at 100° C. for 60 minutes. In order to make the twist (the torsional) angle 220°, the test piece was subjected to rubbing. Plastic beads (Micropearl manufactured by Sekisui Fine Chemical Co., Ltd.) of standard deviation 0.20 μm (3.1% of the diameter) and average diameter 6.5 μm was dispersed so as to realize a quantity of 150 grains/mm$^2$. A flexible epoxy adhesive was screen-printed on the other substrate before stacking these two substrates. The stacked substrates were hardened at 80° C. for 1 hour, and then chiral nematic mixed nematic liquid crystal was vacuum-injected and was then allowed to stand until the cell gap become constant. Then, the injection port was closed.

The appearance of the obtained cell was greenish yellow and its color difference ΔE*max=3.2. Substantially no visual irregular color was confirmed.

EXAMPLE 3

Similarly to Example 2, a cell was processed so as to arrange plastic beads of the standard deviation 0.23 μm (3.3% of the diameter) and the average diameter 7.0 μm to be the dispersion quantity of 170 grains/mm$^2$.

The obtained cell displayed:
appearance: greenish yellow
color difference: ΔE*max 3.5

EXAMPLE 4

FST-1359 manufactured by Sumitomo Bakelite Co., Ltd. and the base film of which is polyether sulfone film was used, and the cell was processed similarly to Example 2. Plastic beads of the standard deviation 0.20 μm (3.1% of the diameter) and the average diameter 6.5 μm was dispersed so as to make the dispersion quantity of 110 grains/mm$^2$.

The obtained cell displayed:
appearance: greenish yellow
color difference: ΔE*max 3.2

COMPARATIVE EXAMPLE 1

A cell was processed similarly to Example 2. Plastic beads of the standard deviation 0.24 μm (3.7% of the diameter) and the average diameter 6.5 μm was dispersed so as to make the dispersion quantity of 150 grains/mm$^2$.

The obtained cell displayed:
appearance: greenish yellow with fine irregular color
color difference: ΔE*max 6.1

COMPARATIVE EXAMPLE 2

A cell was processed similarly to Example 2. Plastic beads of the standard deviation 0.20 μm (3.1% of the diameter) and the average diameter 6.5 μm was dispersed so as to make the dispersion quantity of 70 grains/mm².

The obtained cell displayed:
appearance: greenish yellow with fine irregular color
color difference: Δ*max 5.4

COMPARATIVE EXAMPLE 3

A cell was processed similarly to Example 2. Plastic beads of the standard deviation 0.26 μm (3.7% of the diameter) and the average diameter 7.0 μm was dispersed so as to make the dispersion quantity of 260 grains/mm².

The obtained cell displayed:
appearance: greenish yellow with fine irregular color
color difference: Δ*max 6.5

COMPARATIVE EXAMPLE 4

A cell was produced as in Example 1 such that plastic beads having an average diameter of 8.21 μm, and a standard deviation of 0.40 μm were dispersed so as to provide a disperse density of 150 grains/mm².
Appearance: uneven fine color distribution appeared.
Cell gap: 8.32±0.15 μm

COMPARATIVE EXAMPLE 5

The same liquid crystal cell as that in Example 1 was prepared except that plastic beads having an average diameter of 8.23 μm, and a standard deviation of 0.27 μm were dispersed so as to provide a disperse density of 80 grains/mm².
Appearance: uneven fine color distribution appeared.
Cell gap: 8.32±0.07 μm
the LCD represented in FIG. 3 will now be described in more detail.

(1) A pair of monoaxial stretched polyethylene terephthalate (PET) films each having thereon an ITO film having a thickness of 100 μm was processed to form a pair of 128×256-dot electrodes using a photolithographic technique. "HL-1100" manufactured by Hitachi Chemical Co., Ltd., was coated on the electrodes to form aligning films having a thickness of 1,500 Å and dried at 100° C. for 60 minutes. The resulting products were then rubbed such that the twisted angle was 200°. Plastic beads (manufactured under Trade name "MICROPEARL" by Sekisui Fine Chemical Co., Ltd.) were prepared which had an average diameter of 8.2 μm and a standard deviation of 0.27 μm on the diameters were prepared. Glass fibers (manufactured under Trade name "MICRO ROD" by Nippon Electric Glass Co., Ltd.) was also prepared which had an average diameter of 8.2 μm, an average length of 19 μm, the standard deviation of which was 0.07 μm were also prepared. Those beads and glass fibers were mixed in an isopropyl alcohol solution such that the fibers and plastic beads were provided at disperse densities of 110 pieces/mm² and 20 grains/mm², respectively. The resulting solution was then coated on one of the substrates in a spin coating process. The adhesive of the flexible epoxy resin was applied to the other substrate in screen printing. These substrates were then adhered to each other by the adhesive and the adhesive was set at 80° C. for one hour. A mixture of chiral nematic crystal and nematic liquid crystal were then enclosed in a vacuum sealing process, left until the cell gap became uniform, and the inlet for the liquid crystal was then sealed.

The resulting cell gap d was 8.30±0.05 μm, the appearance of the cell exhibited yellowish green, no uneven color distribution was recognized by the naked eye, and thus uniform excellent display was obtained.

What is claimed is:

1. A super twisted nematic type liquid crystal display device, comprising:
   two of substrates, at least one of which is made of a plastic film;
   transparent electrode films disposed on each inner face of the two of said substrates;
   a plurality of spacers dispersed between said substrates for maintaining the two of said substrates at a predetermined space, said spacers being of spherical grains, a standard deviation of a distribution with respect to diameters of said spherical grains being not more than 3.5% of an average diameter of said spherical grains, a dispersion quantity of said spherical grains between said substrates being 100 to 200 grains/mm²; and
   a liquid crystal enclosed between said substrates and having a twisted angle of 180° to 270° with respect to liquid crystal molecules thereof.

2. The liquid crystal display device according to claim 1, in which said spherical grain is made of plastics, glass fiber or metal oxide.

3. The liquid crystal display device according to claim 1 or 2, in which a standard deviation of the diameters of said spherical grains is 0.3 μm or less.

* * * * *